US008271026B2

(12) United States Patent
Karaoguz

(10) Patent No.: US 8,271,026 B2
(45) Date of Patent: *Sep. 18, 2012

(54) MOBILE COMMUNICATION DEVICE PROVIDING N-WAY COMMUNICATION THROUGH A PLURALITY OF COMMUNICATION SERVICES

(75) Inventor: Jeyhan Karaoguz, Irvine, CA (US)

(73) Assignee: Broadcom Corporation

( * ) Notice: Subject to any disclaimer, the term of this patent is extended or adjusted under 35 U.S.C. 154(b) by 571 days.

This patent is subject to a terminal disclaimer.

(21) Appl. No.: 12/418,731

(22) Filed: Apr. 6, 2009

(65) Prior Publication Data

US 2009/0190532 A1 Jul. 30, 2009

Related U.S. Application Data

(63) Continuation of application No. 11/419,149, filed on May 18, 2006, now Pat. No. 7,522,572.

(60) Provisional application No. 60/775,665, filed on Feb. 22, 2006.

(51) Int. Cl.
*H04M 1/00* (2006.01)

(52) U.S. Cl. ............... 455/552.1; 455/550.1; 455/553.1; 370/328

(58) Field of Classification Search ............... 455/552.1, 455/550.1, 553; 370/328
See application file for complete search history.

(56) References Cited

U.S. PATENT DOCUMENTS

| 5,367,558 | A | 11/1994 | Gillig et al. |
| 5,559,859 | A | 9/1996 | Dai et al. |
| 6,005,884 | A | 12/1999 | Cook et al. |
| 6,381,230 | B1 | 4/2002 | Wheatley et al. |
| 6,934,756 | B2 | 8/2005 | Maes |
| 7,082,106 | B2 | 7/2006 | Sharma et al. |
| 7,333,563 | B2 | 2/2008 | Chan et al. |
| 2002/0086667 | A1 | 7/2002 | Suvanen |
| 2002/0086677 | A1 | 7/2002 | Hildebrand |
| 2003/0092433 | A1 | 5/2003 | Flannery |
| 2004/0142678 | A1 | 7/2004 | Krasner |
| 2007/0030116 | A1* | 2/2007 | Feher ........................ 340/5.53 |
| 2007/0032250 | A1* | 2/2007 | Feher ........................ 455/456.2 |
| 2007/0066228 | A1* | 3/2007 | Leinonen et al. .......... 455/67.11 |
| 2007/0124150 | A1 | 5/2007 | Sinai |
| 2008/0293451 | A1 | 11/2008 | Haskell et al. |

FOREIGN PATENT DOCUMENTS

WO WO03061257 7/2003

OTHER PUBLICATIONS

EPO_Communication dated Jun. 30, 2011 in Application No. 06024345.8-1249 / 1827038 (8 pages).

* cited by examiner

*Primary Examiner* — Danh Le

(74) *Attorney, Agent, or Firm* — Brinks Hofer Gilson & Lione

(57) ABSTRACT

A system and method, in a mobile communication device, providing N-way communication through a plurality of communication services. Various aspects of the present invention provide a mobile communication device comprising a user interface and at least one communication interface module adapted to perform a first communication with a first communication device through a first communication service and perform a second communication with a second communication device through a second communication service. At least one module may be adapted to receive outgoing information from the user interface and to receive first information from the first communication device through the first communication service. The at least one module may also combine at least the received outgoing information and the received first information and transmit such combined information to the second communication device through the second communication service.

44 Claims, 10 Drawing Sheets

MOBILE COMMUNICATION DEVICE PROVIDING N-WAY COMMUNICATION THROUGH A PLURALITY OF COMMUNICATION SERVICES

CROSS-REFERENCE TO RELATED APPLICATIONS/INCORPORATION BY REFERENCE

The present application is a continuation of U.S. application Ser. No. 11/419,149, filed May 18, 2006, which claims benefit from and priority to U.S. Provisional Application No. 60/775,665, filed Feb. 22, 2006, and titled "MOBILE COMMUNICATION DEVICE PROVIDING N-WAY COMMUNICATION THROUGH A PLURALITY OF COMMUNICATION SERVICES". The above-identified applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

A mobile communication device may be capable of communicating over a plurality of communication networks. A user of a mobile communication device may, for example, communicate with a first party that is capable of communicating over a first communication network. The user may also, for example, communicate with a second party that is capable of communicating over a second communication network. The first and second communication networks might not be compatible with one another. For example and without limitation, the first and second communication networks might utilize different respective types of encoding and/or communicate with communication devices utilizing different respective communication protocols.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention comprise a mobile communication device providing N-way communication through a plurality of communication services, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION

Figure 1:
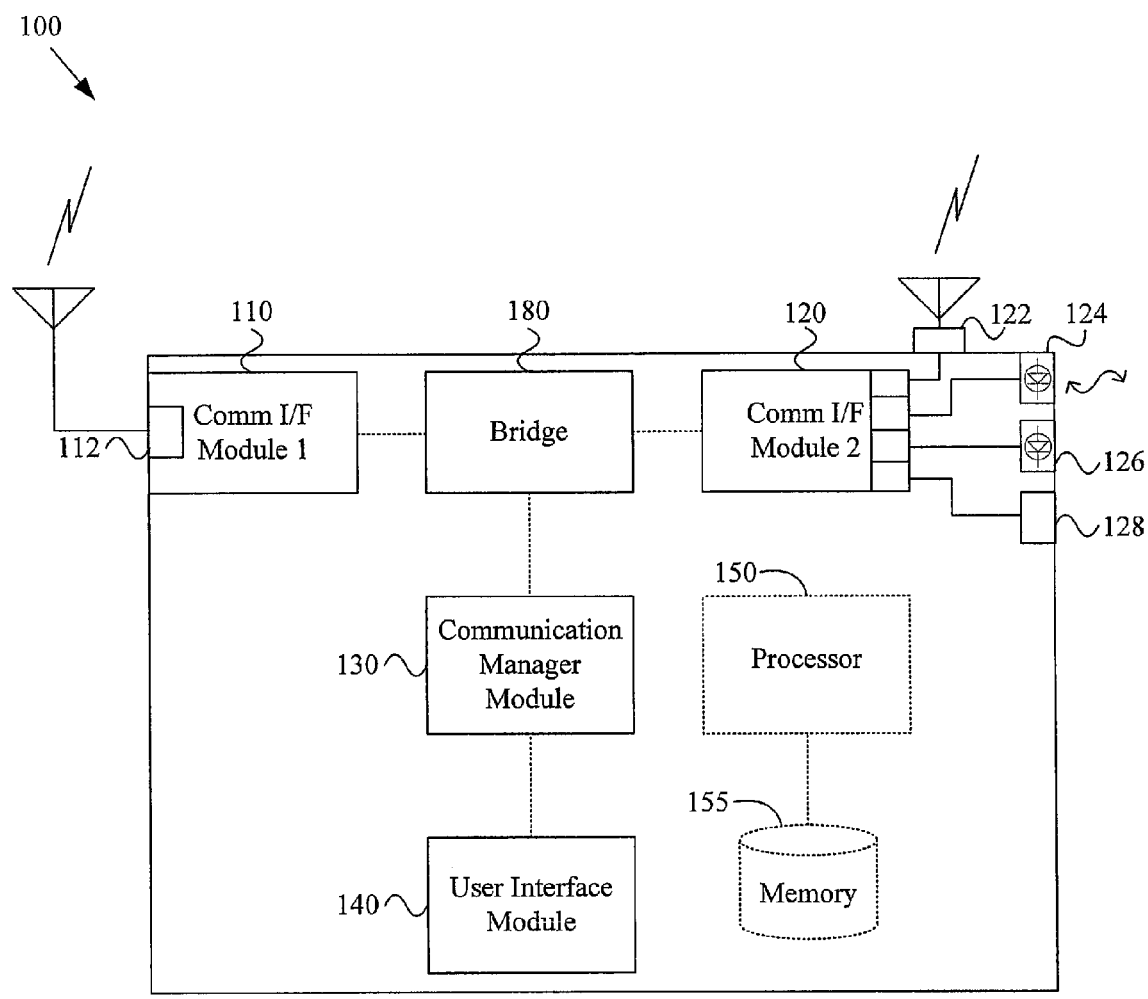
FIG. 1 is a diagram illustrating a portion of an exemplary mobile communication device, in accordance with various aspects of the present invention.

FIG. 1 is a diagram illustrating a portion of an exemplary mobile communication device 100, in accordance with various aspects of the present invention. The mobile communication device 100 may comprise characteristics of any of a variety of types of mobile communication devices. For example and without limitation, the mobile communication device 100 may comprise characteristics of a cellular telephone, personal digital assistant, handheld computer, personal email device, portable music player with communication capability, portable navigation system, etc. Accordingly, the scope of various aspects of the present invention should not be limited by characteristics of any particular type of mobile communication device.

The exemplary mobile communication device 100 may comprise at least one communication interface module adapted to communicate over a plurality of communication networks with a plurality of communication services. The mobile communication device 100 may, for example, comprise a first communication interface module 110 and a second communication interface module 120. Note that the exemplary communication device 100 is illustrated with two discrete communication modules 110, 120 for illustrative clarity only and should not be limiting. For example, the mobile communication device 100 may comprise more than two communication interface modules. Also for example, various communication modules of the mobile communication device 100 may share various hardware and/or software components.

The following discussion will, at times, refer to various communication services. For the following discussion, a communication service may generally coincide with a particular type of communication. Exemplary communication services include, without limitation, a cellular telephone service, a public switched telephone network ("PSTN") service, an Internet service, satellite communication service, Voice over Internet Protocol ("VoIP") service, etc. Various services may, for example, communicate with a mobile communication device utilizing particular respective communication networks, communication protocols, communication media, types of encoding, etc. Generally, a particular communication service may coincide with a particular communication network, but such one-to-one correspondence is not always necessary.

The first communication interface module 110 may, for example, be adapted to communicate over a first communication network. Such a first communication network may, for example, be or comprise various characteristics of a telephony communication network. Such a telephony communication network may, for example, be or comprise various characteristics of a cellular telephone network or the Public Switched Telephone Network ("PSTN"). In an exemplary configuration where the first communication interface module 110 is adapted to communicate over a cellular telephone network, the first communication interface module 110 may, for example, be adapted to communicate in accordance with any of a large variety of cellular communication standards and/or propriety communication protocols (e.g., 1G, 2G, 3G, 4G, CDMA, WCDMA, PDC, TDMA, GSM/GPRS/EDGE, etc.).

Such a first communication network may also, for example, be or comprise various characteristics of a computer communication network. In such an exemplary configuration, a computer communication network may, for example, be or comprise various characteristics of any of a variety of computer communication networks (e.g., the Internet, a Wide Area Network "WAN," a Local Area Network "LAN," a Personal Area Network "PAN," a Metropolitan Area Network "MAN," a terrestrial computer communication network, a satellite computer communication network, etc.). Also, in such an exemplary configuration, the first communication interface module 110 may, for example, be adapted to communicate with the computer communication network utilizing any of a large variety of standard and/or proprietary lower level protocols (e.g., IEEE 802.3, IEEE 802.11, IEEE 802.15, IEEE 802.16, IEEE 802.20, etc.) and/or higher level protocols (e.g., TCP/IP).

The first communication interface module 110 may be adapted to communicate over any of a variety of communication media. For example, the first communication module 110 may be adapted to communicate wirelessly utilizing the wireless port 112. Alternatively, for example, though not illustrated in FIG. 1, the first communication interface module 110 may be adapted to communicate via wired interface, non-tethered optical interface or tethered optical interface.

The second communication interface module 120 may share any or all characteristics with the first communication interface module 110 discussed previously. For example and without limitation, the second communication interface module 120 may be adapted to establish, maintain and communicate over communication links established with any of a variety of types of communication networks or communication services. Also for example, the second communication interface module 120 may be adapted to communicate over any of a variety of communication media (e.g., via a wireless communication port 122, non-tethered optical communication port 124, tethered optical communication port 126 or wired communication port 128).

In a non-limiting exemplary scenario, the first communication interface module 110 may be adapted to perform a first communication with a first communication device through a first communication service. For example, the first communication interface module 110 may be adapted to perform a cellular telephone call with a first communication device (e.g., a cellular telephone) through a cellular telephone service.

Continuing the non-limiting exemplary scenario, the second communication interface module 120 may be adapted to perform a second communication with a second communication device through a second communication service. For example, the second communication interface module 120 may be adapted to perform a voice communication (e.g., VoIP, packet telephony, IP telephony, etc.) with a second communication device (e.g., a VoIP telephone or networked computer) through an Internet or specialized Internet voice service.

In another non-limiting exemplary scenario, the first communication interface module 110 may be adapted to perform a first cellular telephone call with a first cellular telephone through a first cellular telephone service (e.g., a CDMA-based service). The second communication interface module 120 may be adapted to perform a second cellular telephone call with a second cellular telephone through a second cellular telephone service (e.g., a GSM-based service).

In a further non-limiting exemplary scenario, the first communication interface module 110 may be adapted to perform a first voice (or multimedia) conversation with a first voice (or multimedia) cellular phone through a first cellular telephone service. The second communication interface module 120 may be adapted to perform a second voice (or multimedia) conversation with a second communication device through a computer network (e.g., a LAN, PAN, Internet, etc.).

The exemplary mobile communication device 100 may also comprise a communication manager module 130 generally adapted to manage communications occurring with the mobile communication device 100. The communication manager module 130 may be or comprise characteristics of any of a large variety of modules or devices associated with performing general communication tasks in a mobile communication device. For example and without limitation, the communication manager module 130 may comprise or oversee operation of various signal processors, codecs, user interfaces, applications, etc., which may be associated with any of the plurality of communication networks or services with which the mobile communication device 100 may be capable of communicating.

For example, the communication manager module 130 may be adapted to perform or manage various secure access and/or secure communication functionalities. Also for example, the communication manager module 130 may be adapted to perform or manage various power management functionalities. Additionally for example, the communication manager module 130 may be adapted to control user access to particular functionalities that the mobile communication device 100 is capable of performing.

Also for example, the communication manager module 130 may be adapted to perform or manage various flows of information within the mobile communication device 130. For example, the communication manager module 130 may be adapted to control the flow of information between various protocol stack layers. Also for example, the communication manager module 130 may be adapted to perform or manage the functionality of various protocol stack layers. The communication manager module 130 may thus be adapted to manage the flow of various types of information between various devices, modules or sub-modules. Such types of information may, for example, include control information, numerical information, textual information, audio information, video information, graphical information, pictorial information, etc.

The exemplary mobile communication device 100 may also comprise a user interface module 140. The user interface module 140 may generally provide an interface between the mobile communication device 100 and a user of the mobile communication device 100. The user interface module 140 may comprise characteristics of any of a variety of user interfaces. The user interface module 140 may, for example and without limitation, be adapted to provide any of a variety of audio, video and/or tactile user interfaces. For example and without limitation, the user interface module 140 may be adapted to provide video display, audio speaker, video camera, microphone, touch screen, touchpad, keypad and vibration U/I functionality.

For example, the mobile communication device 100 (e.g., the communication manager module 130) may utilize the user interface module 140 to provide a communication interface (e.g., video, audio and/or textual) between a user of the mobile communication device 100 and other devices communicatively coupled to the mobile communication device 100. For example, the mobile communication device 100 may utilize the user interface module 140 to notify a user of an incoming message to the mobile communication device 100 from another communication device (e.g., another mobile communication device). Also for example, the mobile communication device 100 may utilize the user interface module 140 to provide a user interface for information communicated over various communication networks, where the user interface shares various characteristics with a typical mobile telephone user interface. As a non-limiting example, the mobile communication device 100 may utilize the user interface module 140, for communications between the mobile communication device 100 and another mobile communication device over a computer communication network, to provide a user interface that is generally the same as the user interface for a mobile telephone communication over a mobile telephone communication network. The scope of various aspects of the present invention should not be limited by characteristics of a particular type of user interface or hardware and/or software that provide a particular type of user interface.

The user interface module 140 may be adapted to (e.g., autonomously or in conjunction with other modules, for example, the communication manager module 130) provide a communication interface between a user and a plurality of other communication devices simultaneously. For example, the user interface module 140 may provide received conversation information (e.g., cellular voice information, VoIP information, etc.) from a plurality of sources simultaneously. Also for example, the user interface module 140 may obtain (or receive) conversation information from a user, which is to be provided to a plurality of destinations simultaneously.

The user interface module 140 may be adapted to provide various user interface features to a user to enhance the capability of a user to utilize the mobile communication device 100 to communicate with a plurality of others simultaneously. For example, the user interface module 140 may be adapted to provide active connection (or communication link) information corresponding to a plurality of other communication devices. Also for example, the user interface module 140 may be adapted to provide contact information corresponding to a plurality of other communication devices through one or more respective communication services.

The mobile communication device 100 may comprise a processor 150 and a memory 155. The processor 150 and memory 155 may, for example, be utilized to implement any of the modules discussed herein or portions thereof. The processor 150 and memory 155 may also be utilized by any of the modules discussed herein (e.g., to perform processing and/or to store information in a volatile or non-volatile manner).

The mobile communication device 100 may also comprise a bridge module 180. The bridge module 180 may, for example, be adapted to receive outgoing information from the user interface module 140. The bridge module 180 may also be adapted to receive first information from the first communication interface module 110 (e.g., information originating from a first communication device to which the mobile communication device 100 is communicatively coupled). The bridge module 180 may further be adapted to combine at least the received outgoing information and the received first information. Note that the bridge module 180 may be adapted to combine information from additional sources (e.g., information originating from another communication device to which the mobile communication device 100 is communicatively coupled). The bridge module 180 may then, for example, utilize or direct one or more communication interface modules (e.g., the second communication interface module 120) to transmit the combined information.

The information combined by the bridge module 180 may comprise any of a variety of characteristics. For example, the information may be in the form of analog and/or digital signals. Also for example, the information may comprise audio and/or video information. Further for example, the information may generally correspond to voice or multimedia information associated with a real-time conversation (e.g., a 3-way, 4-way or N-way conversation).

Also for example, the information may be non-encoded (e.g., never been encoded, not yet encoded, or previously encoded but now decoded, etc.). In a non-limiting exemplary scenario, the bridge module 180 may be adapted to receive and combine non-encoded outgoing information from the user interface module 140 and non-encoded first information from the first communication module 110 (e.g., directly from or through a decoder). Such combined information may then be encoded, if desired, and transmitted (e.g., utilizing the second communication interface module 120). Refer to the discussion of FIG. 2 for additional examples, some of which relate to receiving and/or combining non-encoded information.

Also for example, the information may be in the form of encoded signals. In a non-limiting exemplary scenario, the bridge module 180 may be adapted to receive encoded outgoing information from the user interface module 140 (e.g., directly from or through an encoder). Also for example, the bridge module 180 may be adapted to receive encoded first information from the first communication module (e.g., directly from or through an encoder or transcoder). The bridge module 180 may then, for example, be adapted to combine such received encoded information. Such combined encoded information may then, for example, be transmitted (e.g., utilizing the second communication interface module 120) or transcoded to another format and then transmitted. Refer to the discussion of FIG. 3 for additional examples, some of which relate to receiving and/or combining encoded information.

Further for example, the information may be in the form of information packets. In a non-limiting exemplary scenario, the bridge module 180 may be adapted to receive packets of information from the user interface module 140. Also for example, the bridge module 180 may be adapted to receive packets of information from the first communication module 110. Such packets may or may not contain information that has been encoded in accordance with different respective encoding schemes. The bridge module 180 may then, for example, be adapted to combine such packetized information (e.g., utilizing a packet multiplexer or by repacketizing and multiplexing such packetized information). Refer to the discussion of FIG. 4 for additional examples, some of which relate to receiving and/or combining packetized information.

In general, the bridge module 180 may be adapted to receive outgoing information from, for example, a user interface module 140 and at least one other communication device and combine such information for subsequent transmission. Accordingly, the scope of various aspects of the present invention should not be limited by characteristics of any particular type of information or any particular manner of combining such information.

The bridge module 180 may also, for example, be adapted to combine signals received from other communication devices for ultimate presentation to a user of the mobile communication device 100. For example, the bridge module 180 may be adapted to combine and/or decode signals received from first and/or second communication devices through the first and/or second communication modules 110 and 120. The bridge module 180 may then present such information to the user interface module 140 for presentation to the user.

Figure 2:
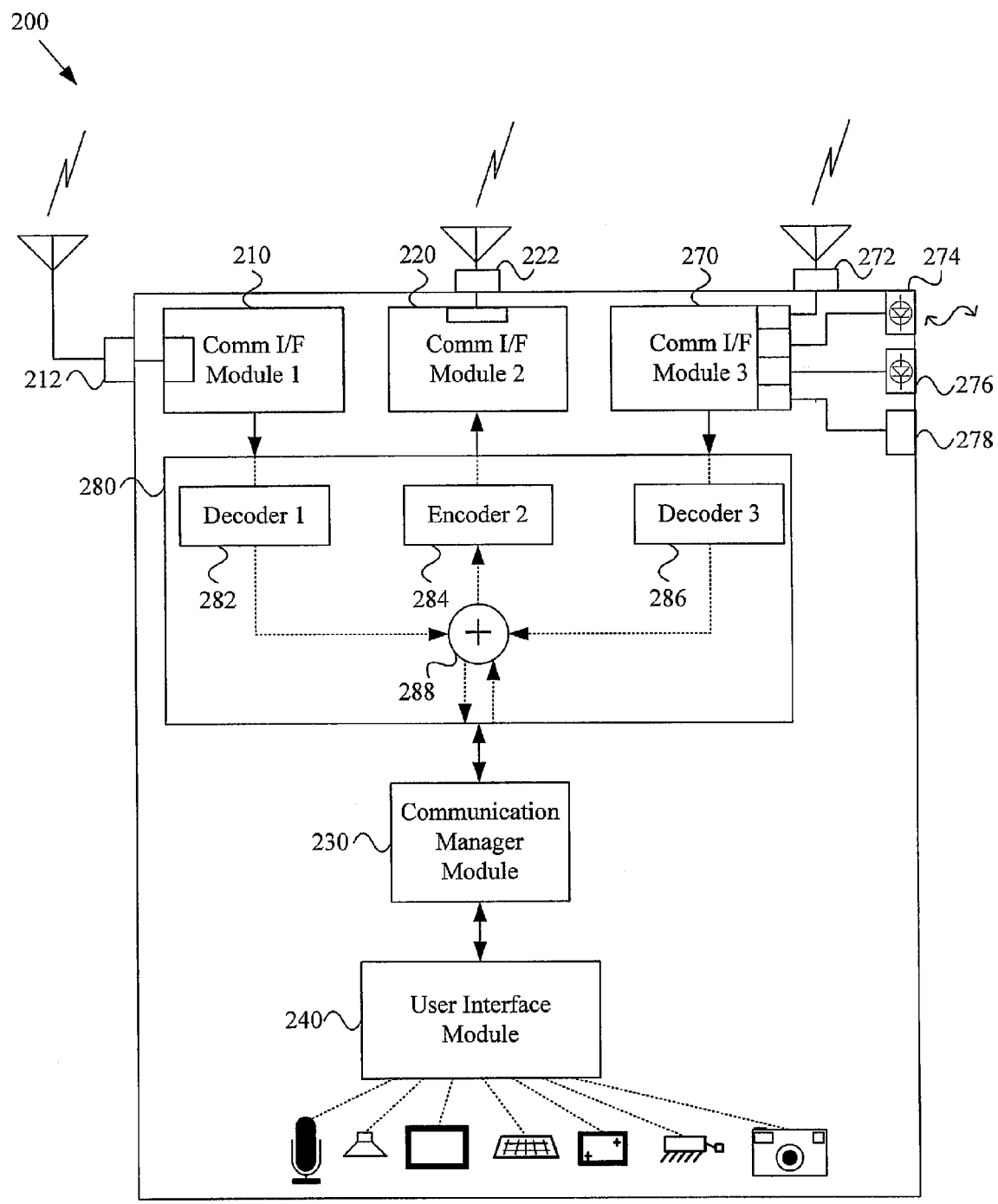
FIG. 2 is a diagram illustrating a portion of another exemplary mobile communication device, in accordance with various aspects of the present invention.

FIG. 2 is a diagram illustrating a portion of another exemplary mobile communication device 200, in accordance with various aspects of the present invention. The exemplary mobile communication device 200 may, for example and without limitation, share any or all limitations with the exemplary mobile communication device 100 illustrated in FIG. 1 and discussed previously. For example, the first communication interface module 210, second communication interface module 220, communication manager module 230, user interface module 240 and bridge module 280 may share any or all characteristics with similarly named modules of the mobile communication device 100 of FIG. 1.

The user interface module 240 is illustrated comprising various user interface devices (or interfaces therefor). For example, the user interface module 240 may comprise a microphone, output speaker, video display, keyboard or keypad, touch screen, vibratory output and camera input.

As discussed previously, a mobile communication device may comprise any number of communication interface modules. The third communication interface module 270 may share any or all characteristics with the first and second communication interface modules 210 and 220. For example and without limitation, the third communication interface module 270 may be adapted to establish, maintain and communicate over communication links established with any of a variety of types of communication networks or communication services. Also for example, the third communication interface module 270 may be adapted to communicate over any of a variety of communication media (e.g., via a wireless communication port 272, non-tethered optical communication port 274, tethered optical communication port 276 or wired communication port 278).

As discussed previously with regard to the mobile communication device of FIG. 1, the exemplary bridge module 280 may be adapted to receive and/or combine non-encoded information. For example, the bridge module 280 may be adapted to receive non-encoded information from the first communication interface module 210 (e.g., directly or through the first decoder 282). Similarly, the bridge module 280 may be adapted to receive non-encoded information from the third communication interface module 270 (e.g., directly or through the third decoder 286). The bridge module 280 may further be adapted to receive non-encoded information from the user interface module 240 (e.g., directly or through one or more intervening modules).

The exemplary bridge module 280 may comprise a combiner 288 (e.g., an analog or digital combiner) that is adapted to combine signals and/or data corresponding to the received non-encoded information. The combiner 288 may comprise characteristics of any of a variety of types of combiner hardware and/or software. For example and without limitation, the combiner 288 may comprise characteristics of signal or data addition hardware and/or software. The combiner 288 may also, for example, comprise characteristics of various filtering and/or amplification (or scaling) modules.

The combiner 288 may, for example, output a signal representative of the combined signals to the second communication interface module 220 for transmission to another communication device. As a non-limiting example, the exemplary bridge module 280 may also comprise a second encoder 284. The second encoder 284 may encode the combined signal received from the combiner 288 in accordance with a particular type of encoding scheme. For example, the second encoder 284 may encode the combined signal in accordance with an encoding scheme that the intended recipient of the corresponding transmitted signal is capable of decoding.

In a non-limiting exemplary scenario, the mobile communication device 200 may be utilized to communicate audio information (e.g., to participate in a voice conversation communication). The bridge module 280 may be adapted to receive outgoing voice information from the user interface module 240 (e.g., directly or through the communication manager module 230 and/or other intervening modules). The bridge module 280 may also be adapted to receive first voice information from the first communication interface module 210. Such first voice information may, for example, have originated at a first communication device that is communicatively coupled to the mobile communication device 200 via a first communication service (e.g., a cellular telephony service). The outgoing voice information may, for example, be carried in a non-encoded signal, and the first voice information may also be carried in a non-encoded signal.

Continuing the non-limiting exemplary scenario, the bridge module 280 (e.g., the combiner 288) may then be adapted to combine at least the received outgoing voice information and received first voice information. For example, the combiner 288 may be adapted to combine (e.g., add) respective analog or digital signals corresponding to the outgoing voice information and first voice information. The combiner 288 may then output a signal representative of the combined outgoing voice information and first voice information. The second encoder 284 may receive the combined voice signal from the combiner 288, encode the combined voice signal (e.g., in accordance with an audio encoding standard) and output the encoded combined voice signal to the second communication interface module 220. The second communication interface module 220 may then transmit the encoded combined voice signal to a second communication device through a second communication service (e.g., a computer network or VoIP service).

In another exemplary scenario, the mobile communication device 200 may utilize the third communication interface module 270 to communicate with a third communication device through a third communication service. In such a scenario, the combiner 288 may also receive non-encoded third voice (or audio) information from the third communication interface module 270 (e.g., directly or through the third decoder 286). The combiner 288 may then, for example, combine the received outgoing voice information, received first voice information and received third voice information.

The second encoder 284 may then encode a signal corresponding to the combined information for subsequent transmission to the second communication device.

Note that though the exemplary scenario above was presented in terms of voice communication, the scope of various aspects of the present invention should not be limited by characteristics of voice communication. Various other exemplary scenarios to be presented will similarly present voice communication for illustrative and non-limiting purposes.

As discussed previously with regard to the exemplary mobile communication device 100 illustrated in FIG. 1, the bridge module 280 may also, for example, be adapted to combine signals received from other communication devices for ultimate presentation to a user of the mobile communication device 200. For example, the bridge module 280 may be adapted to combine and/or decode signals (e.g., utilizing the first decoder 282, a second decoder not shown and/or the third decoder 286) received from first, second and/or third communication devices through the first, second and/or third communication modules 210, 220 and 270. The bridge module 280 may then present such information to the user interface module 240 (e.g., directly or through one or more intervening modules) for presentation to the user.

Figure 3:
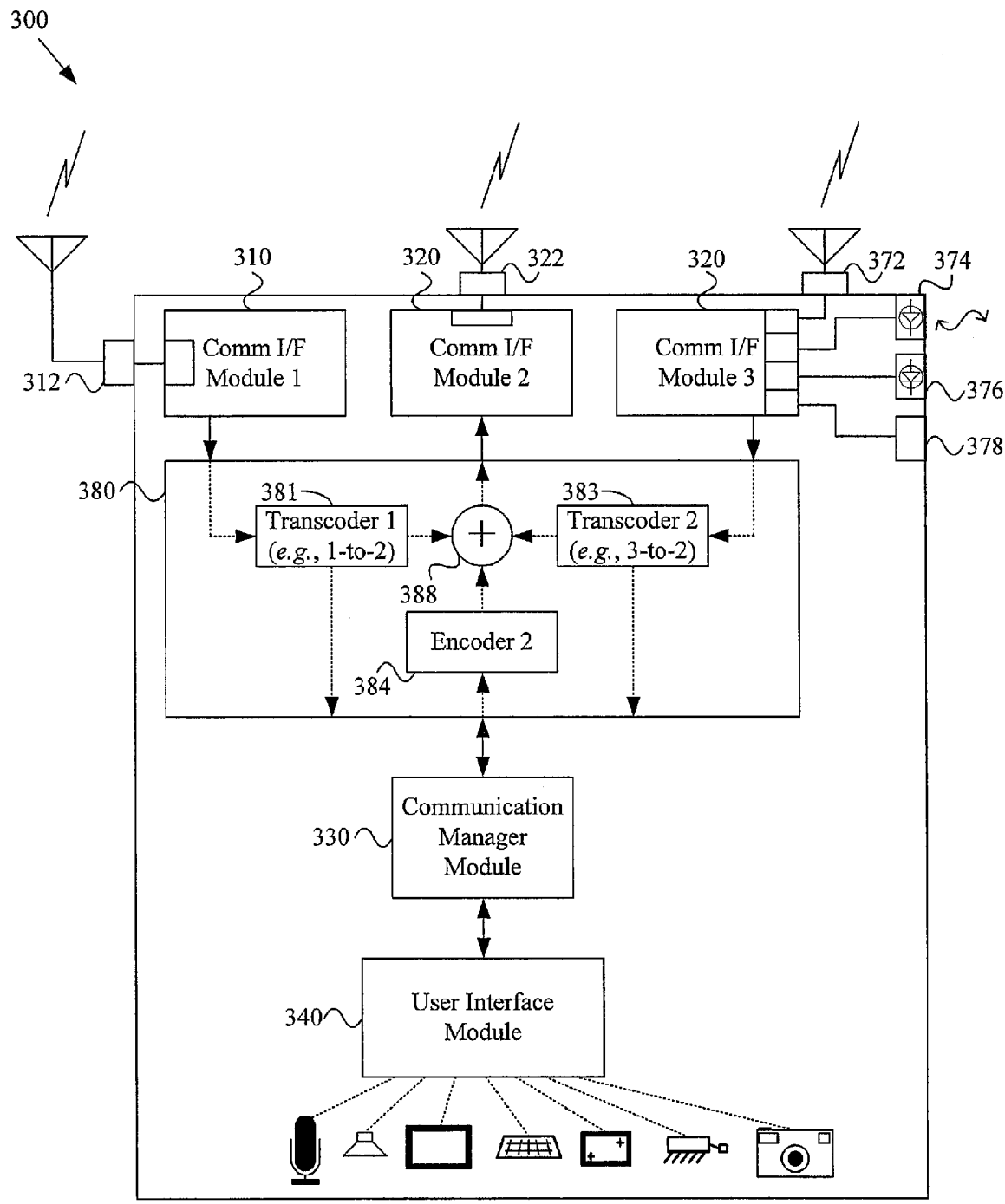
FIG. 3 is a diagram illustrating a portion of an additional exemplary mobile communication device, in accordance with various aspects of the present invention.

FIG. 3 is a diagram illustrating a portion of an additional exemplary mobile communication device 300, in accordance with various aspects of the present invention. The exemplary mobile communication device 300 may, for example and without limitation, share any or all limitations with the exemplary mobile communication devices 100 and 200 illustrated in FIGS. 1-2 and discussed previously. For example, the first communication interface module 310, second communication interface module 320, third communication interface module 370, communication manager module 330, user interface module 340 and bridge module 380 may share any or all characteristics with similarly named modules of the mobile communication devices 100 and 200 of FIGS. 1-2.

As discussed previously with regard to the mobile communication device of FIG. 1, the exemplary bridge module 380 may be adapted to receive and/or combine encoded information. For example, the bridge module 380 may be adapted to receive encoded information from the first communication interface module 310 (e.g., directly or through the first transcoder 381). Similarly, the bridge module 380 may be adapted to receive encoded information from the third communication interface module 370 (e.g., directly or through the third transcoder 383). The bridge module 380 may further be adapted to receive encoded information from the user interface module 340 (e.g., directly or through the second encoder 384 and/or one or more other intervening modules).

The exemplary bridge module 380 may comprise a combiner 388 (e.g., an analog or digital combiner) that is adapted to combine signals or data corresponding to the received encoded information. The combiner 388 may comprise characteristics of any of a variety of types of combiner hardware and/or software. For example and without limitation, the combiner 388 may comprise characteristics of signal or data addition hardware and/or software. The combiner 388 may also, for example, comprise characteristics of various filtering and/or amplification (or scaling) modules.

The exemplary bridge module 380 is illustrated with a first transcoder 381. The first transcoder 381 may, for example, be adapted to convert encoded information between various types of coding. For example and without limitation, the first transcoder 381 may be adapted to receive first information from the first communication interface module 310, where the first information is encoded according to a first type of encoding (e.g., a first particular audio and/or video encoding standard). The first transcoder 381 may then be adapted to convert the encoding of the first information to a second type of encoding (e.g., a second particular audio and/or video encoding standard). The first transcoder 381 may, for example, be adapted to directly convert between types of encoding or may be adapted to indirectly convert between types of encoding (e.g., first decoding from the first type of encoding and then encoding in accordance with a second type of encoding).

In a non-limiting exemplary configuration, the first transcoder 381 may be adapted to transcode between various selectable types of encoding (e.g., between a first plurality of encoding types and a second plurality of encoding types). For example, in a non-limiting exemplary scenario where the mobile communication device 300 receives first information encoded according to a first type of encoding, the mobile communication device 300 (e.g. the communication manager module 330 or the transcoder 381) may be adapted to determine that the first information is encoded according to the first type of encoding. Continuing the exemplary scenario, the mobile communication device 300 may also be communicating information with the second communication device utilizing a second type of encoding. To establish encoding uniformity, the mobile communication device 300 may direct (or control) the transcoder 381 to transcode the first information from the first type of encoding to the second type of encoding for subsequent combining and transmission to the second communication device.

The mobile communication device 300 may also comprise a second transcoder 383. The second transcoder 383 may, for example, share any or all characteristics with the first transcoder 381 discussed previously. For example, the second transcoder 383 may be adapted to transcode between a third type of encoding and the second type of encoding. Also for example, the second transcoder 383 may be adapted to transcode between selectable types of encoding.

The combiner 388 may be adapted to receive encoded signals representative of the outgoing information, first received information and third received information. Such information, as discussed previously, might have been converted to a consistent type of encoding (e.g., by the first transcoder 381, second transcoder 383 and second encoder 384). Note that such consistent encoding might not be necessary, but may be preferred in various scenarios.

The combiner 388 may, for example, output a signal representative of the combined signals to the second communication interface module 320 for transmission to another communication device. For example, the combiner 388 may output the combined signal to the second communication interface module 320 for subsequent transmission to a second communication device (e.g., through a second communication service).

In a non-limiting exemplary scenario, the mobile communication device 300 may be utilized to communicate audio information (e.g., to participate in a voice conversation communication). The bridge module 380 may be adapted to receive outgoing voice information from the user interface module 340 (e.g., directly through the communication manager module 330 and/or other intervening modules). The bridge module 340 may, for example, utilize the second encoder 384 to encode the received outgoing voice information in accordance with a second type of audio encoding.

The bridge module 380 may also be adapted to receive first voice information from the first communication interface module 310. Such first voice information may, for example, be received by the first communication interface module 310 already encoded in accordance with the second type of audio encoding or, alternatively, the first transcoder 381 may transcode the received first voice information from a first type of encoding to the second type of encoding.

Such first audio information may, for example, have originated at a first communication device that is communicatively coupled to the mobile communication device 300 via a first communication service (e.g., a cellular telephony service).

Continuing the non-limiting exemplary scenario, the bridge module 380 (e.g., the combiner 388) may then be adapted to combine at least the received outgoing voice information and received first voice information (e.g., both of which may have already been encoded according to the second type of encoding). For example, the combiner 388 may be adapted to combine (e.g., add) respective analog or digital signals corresponding to the outgoing voice information and first voice information. The combiner 388 may then output a signal representative of the combined outgoing voice information and first voice information to the second communication interface module 320. The second communication interface module 320 may then transmit the encoded combined voice signal to a second communication device through a second communication service (e.g., a computer network or VoIP service).

In another exemplary scenario, the mobile communication device 300 may utilize the third communication interface module 370 to communicate with a third communication device through a third communication service. In such a scenario, the combiner 388 may also receive encoded third voice (or audio) information from the third communication interface module 370 (e.g., directly or through the second transcoder 383). The combiner 388 may then, for example, combine the received outgoing voice information, received first voice information and received third voice information. The combiner 388 may then communicate the combined encoded information to the second communication interface module 320 for subsequent transmission to the second communication device. Note that the scope of various aspects of the present invention may be extended to cover scenarios including the communication of information with any plurality of other communication devices.

As discussed previously with regard to the exemplary mobile communication device 300 illustrated in FIG. 3, the bridge module 380 may also, for example, be adapted to combine signals received from other communication devices for ultimate presentation to a user of the mobile communication device 300. For example, the bridge module 380 may be adapted to combine and/or decode signals (e.g., utilizing the first transcoder 381, second transcoder 383 or other transcoder(s) and decoder(s)) received from first, second and/or third communication devices through the first, second and/or third communication modules 310, 320 and 370. The bridge module 380 may then present such information to the user interface module 340 for presentation to the user.

Figure 4:
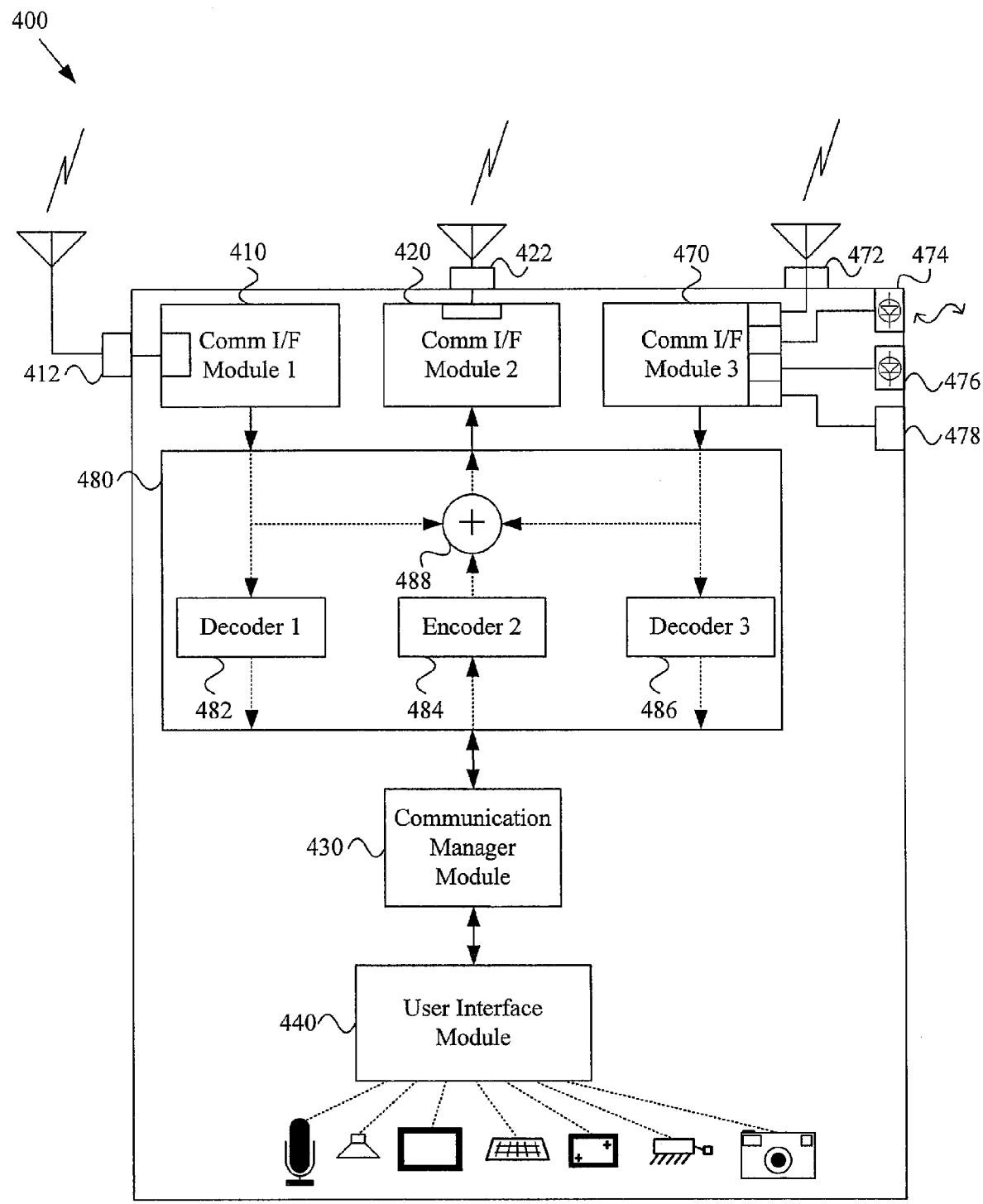
FIG. 4 is a diagram illustrating a portion of yet another exemplary mobile communication device, in accordance with various aspects of the present invention.

FIG. 4 is a diagram illustrating a portion of yet another exemplary mobile communication device 400, in accordance with various aspects of the present invention. The exemplary mobile communication device 400 may, for example and without limitation, share any or all limitations with the exemplary mobile communication devices 100, 200 and 300 illustrated in FIGS. 1-3 and discussed previously. For example, the first communication interface module 410, second communication interface module 420, third communication interface module 470, communication manager module 430, user interface module 440 and bridge module 480 may share any or all characteristics with similarly named modules of the mobile communication devices 100, 200 and 300 of FIGS. 1-3.

As discussed previously with regard to the mobile communication device 100 of FIG. 1, the exemplary bridge module 480 may be adapted to receive and/or combine packetized information. For example, the bridge module 480 may be adapted to receive packetized information from the first communication interface module 410 (e.g., directly or through an intervening module). Similarly, the bridge module 480 may be adapted to receive packetized information from the third communication interface module 470 (e.g., directly or through an intervening module). The bridge module 480 may further be adapted to receive packetized information from the user interface module 440 (e.g., directly or through one or more intervening modules, for example, the second encoder 484).

The exemplary bridge module 480 may comprise a combiner 488 that is adapted to combine signals corresponding to the received packetized information. The combiner 488 may comprise characteristics of any of a variety of types of combiner hardware and/or software. For example and without limitation, the combiner 488 may comprise characteristics of a data packet multiplexer adapted to combine plural data packet streams into a single packet stream. The combiner 488 may also, for example, comprise characteristics of various filtering, buffering and/or amplification modules.

The combiner 488 may, for example, output a signal representative of the combined signals to the second communication interface module 420 for transmission to another communication device. As a non-limiting example, the exemplary bridge module 480 may be adapted to combine packet streams into a single packet stream, even though various packets may comprise information that has been encoded utilizing a plurality of different types of encoding techniques. In such an example, a receiver of such a combined packet stream might then perform different types of decoding on different types of packets and then combine the decoded information for presentation to a user. Alternatively, the bridge 480 may, as discussed previously, comprise one or more transcoders to transcode between encoding formats. The bridge 480 may further be adapted to repacketize combined information into a consistent packet format.

In a non-limiting exemplary scenario, the mobile communication device 400 may be utilized to communicate audio information (e.g., to participate in a voice conversation communication). The bridge module 480 may be adapted to receive outgoing voice information from the user interface module 440 (e.g., directly through the communication manager module 430, second encoder 484 and/or other intervening modules). The bridge module 480 may also be adapted to receive first packetized voice information from the first communication interface module 410. Such first packetized voice information may, for example, have originated at a first communication device that is communicatively coupled to the mobile communication device 400 via a first communication service (e.g., a cellular telephony service).

Continuing the non-limiting exemplary scenario, the bridge module 480 (e.g., the combiner 488) may then be adapted to combine at least the received packetized outgoing voice information and received first packetized voice information. For example, the combiner 488 may be adapted to combine (e.g., multiplex) respective packet streams corresponding to the outgoing packetized voice information and first packetized voice information. The combiner 388 may then output a signal representative of the combined packetized outgoing voice information and first packetized voice information. The second communication interface module 420 may then transmit the combined packetized voice signal to a second communication device through a second communication service (e.g., a computer network or cellular telephony network).

In another exemplary scenario, the mobile communication device 400 may utilize the third communication interface module 470 to communicate with a third communication device through a third communication service. In such a scenario, the combiner 488 may also receive packetized third voice (or audio) information from the third communication interface module 470 (e.g., directly or through an intervening module). The combiner 488 may then, for example, combine the received outgoing voice information, received first voice information and received third voice information. The combiner 488 may then output a combined signal corresponding to the combined information to the second communication interface module 420 for subsequent transmission to the second communication device.

Note that though the exemplary scenario above was presented in terms of voice communication, the scope of various aspects of the present invention should not be limited by characteristics of voice communication. Various other exemplary scenarios to be presented will similarly present voice communication for illustrative and non-limiting purposes.

As discussed previously with regard to the exemplary mobile communication device 100 illustrated in FIG. 1, the bridge module 480 may also, for example, be adapted to combine signals received from other communication devices for ultimate presentation to a user of the mobile communication device 400. For example, the bridge module 480 may be adapted to combine and/or decode signals (e.g., utilizing the first decoder 482, a second decoder not shown and/or the third decoder 486) received from first, second and/or third communication devices through the first, second and/or third communication modules 410, 420 and 470. The bridge module 480 may then present such information to the user interface module 440 for presentation to the user.

Figure 5:
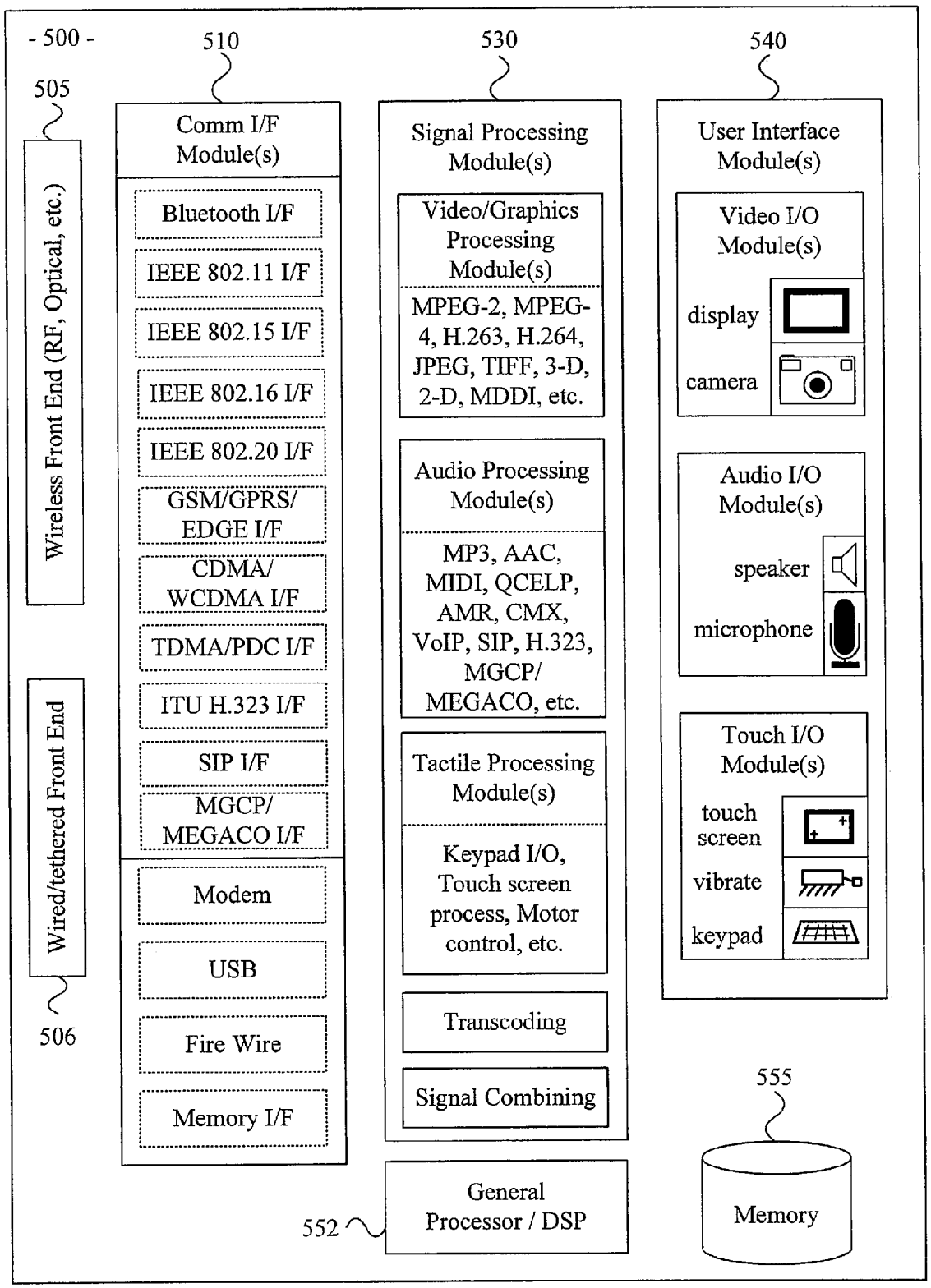
FIG. 5 is a diagram illustrating a portion of still another exemplary mobile communication device, in accordance with various aspects of the present invention.

FIG. 5 is a diagram illustrating a portion of still another exemplary mobile communication device 500, in accordance with various aspects of the present invention. The exemplary mobile communication device 500 may, for example, share any or all characteristics with the exemplary mobile communication devices 100-400 illustrated in FIGS. 1-4 and discussed previously.

The exemplary mobile communication device 500 may comprise a wireless front end 505 and/or a wired/tethered front end 506. The wireless front end 505 and the wired/tethered front end 506 may be communicatively coupled to any of a variety of communication interface modules 510. The exemplary mobile communication device 500 is illustrated with a non-limiting exemplary set of communication interface modules 510, including: a Bluetooth interface module, IEEE 802.11 interface module, IEEE 802.15 interface module, IEEE 802.16 interface module, IEEE 802.20 interface module, GSM/GPRS/EDGE interface module, CDMA/WCDMA interface module, TDMA/PDC interface module, H.323 interface module, SIP interface module, MGCP/MEGACO interface module, modem module, USB module, fire wire module and memory interface module (e.g., for interfacing with off-board or removable memory). The wireless front end 505, wired/tethered front end 506 and communication interface modules 510 may, for example and without limitation, share any or all characteristics with the communication interface module(s) 110, 120, 210, 220, 270, 310, 320, 370, 410, 420 and 470 of the exemplary mobile communication devices 100-400 illustrated in FIGS. 1-4 and discussed previously.

The exemplary mobile communication device 500 may also comprise any of a variety of user interface module(s) 540. The user interface module(s) 540 may, for example and without limitation, share any or all characteristics with the user interface module(s) 140, 240, 340 and 440 of the exemplary mobile communication devices 100-400 illustrated in FIGS. 1-4 and discussed previously. The exemplary mobile communication device 500 is illustrated with a non-limiting exemplary set of user interface module(s) 540 (or sub-modules). The user interface module(s) 540 may, for example, comprise any of a variety of video/graphics processing modules, audio processing modules, and tactile signal processing modules. The mobile communication device 500 may also comprise compatible user interface devices corresponding to the various user interface module(s) 540 (e.g., a video display, camera, speaker, microphone, touch screen, keypad, vibrator, etc.).

The exemplary mobile communication device 500 is illustrated with a non-limiting exemplary set of signal processing modules 530, which may be selectively utilized in accordance with current signal processing needs. The signal processing modules 530 may, for example, comprise various video, audio, textual and tactile signal-processing modules. The signal processing modules 530 may generally, for example, process information conveyed between the front ends 505 and 506 and communication interface module(s) 510 of the mobile communication device 500 and the user interface module(s) 540 of the mobile communication device 500.

The signal processing modules 530 may, for example and without limitation, comprise various video/graphics processing modules, various audio processing modules (e.g., VoIP processing modules) and various tactile processing modules. The signal processing modules 530 may, for example, share any or all characteristics with the communication manager modules 130, 230, 330 and 430 illustrated in FIGS. 1-4 and discussed previously. The signal processing module 530 may also, for example, share any or all characteristics with the bridge modules 180, 280, 380 and 480 discussed previously and various exemplary components thereof (e.g., decoders, encoders and transcoders).

The exemplary mobile communication device 500 may also comprise a general processor 552 (and/or a digital signal processor) and on-board memory 555. The general processor 552, which may be a baseband processor, for example, and memory 555 may perform any of a wide variety of operational tasks for the mobile communication device 500. For example and without limitation, the general processor 552 and memory 555 may share various characteristics with the communication interface modules, bridge modules, communication manager modules and user interface modules of the exemplary mobile communication devices 100-400 illustrated in FIGS. 1-4 and discussed previously.

Figure 6:
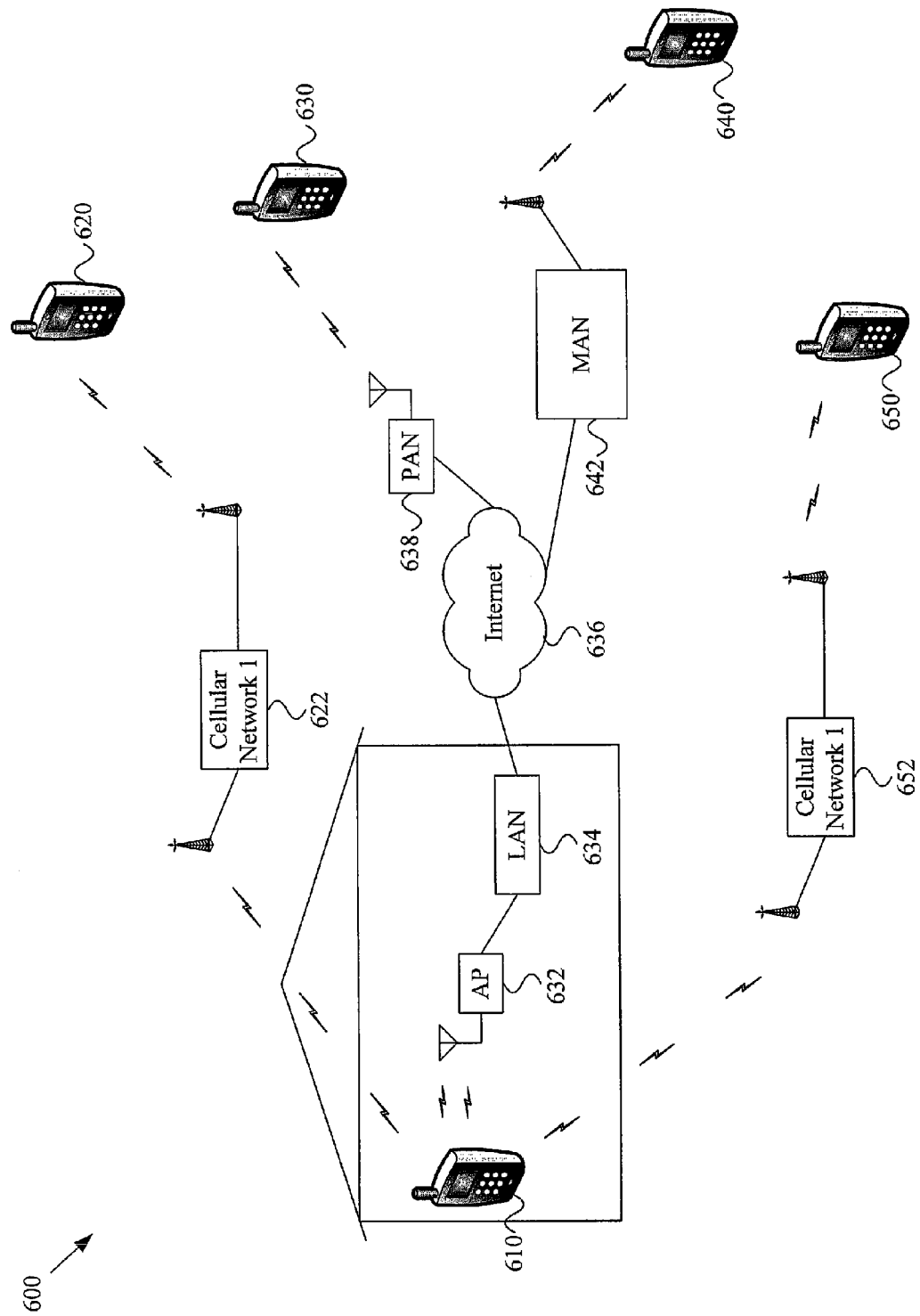
FIG. 6 is a diagram illustrating an exemplary communication environment, in accordance with various aspects of the present invention.

FIG. 6 is a diagram illustrating an exemplary communication environment 600, in accordance with various aspects of the present invention. The exemplary communication environment 600 shows a variety of exemplary mobile communication devices 610, 620, 630, 640 and 650 in a non-limiting exemplary communication scenario. The exemplary mobile communication devices 610, 620, 630, 640 and 650 may, for example, share any or all characteristics with the exemplary mobile communication devices 100-500 illustrated in FIGS. 1-5 and discussed previously. The following exemplary scenario will be presented in terms of voice conversation communication. Note, however, that the scope of various aspects of the present invention should not be limited to voice conversation communication. For example, various aspects of the present invention readily extend to multimedia conversation communication.

The first mobile communication device 610 may, for example, be communicating a voice conversation with the second mobile communication device 620 through the first cellular communication network 622 (e.g., through a first cellular telephone service). The first mobile communication device 610 may also, for example, be simultaneously communicating a voice conversation with the third mobile communication device 630. Such communication may, for example, occur over a communication link through the LAN access point 632, Local Area Network ("LAN") 634, Internet 636 and Personal Area Network ("PAN") 638 (e.g., through at least a first Internet access or VoIP service). Such communication may, for example, comprise communicating voice conversation information utilizing VoIP.

In a non-limiting exemplary scenario, a user of the second mobile communication device 620 may speak, resulting in the communication of second voice conversation information to the first mobile communication device 610 through the first cellular network 622. The first mobile communication device 610 may, for example, receive the second voice conversation information, combine such information with outgoing voice information, if any, from a user of the first mobile communication device 610, place such combined information in a form compatible with VoIP and retransmit such information to the third mobile communication device 630.

As discussed previously with regard to FIGS. 1-5, the first mobile communication device 610 may process, combine and retransmit received information in any of a variety of manners. Also, the first mobile communication device 610 may also present the received second voice conversation information to a user of the first mobile communication device 610. The first mobile communication device 610 may additionally present received third voice conversation information received from the third mobile communication device 630 (e.g., combined with the second voice conversation information) to a user of the first mobile communication device 610.

Continuing the non-limiting exemplary scenario, the first mobile communication device 610 may also be simultaneously communicating with the fourth mobile communication device 640. Such communication may, for example, occur over a communication link through the LAN access point 632, Local Area Network ("LAN") 634, Internet 636 and Metropolitan Area Network ("MAN") 642 (e.g., through at least a second Internet access service). Such communication may, for example, comprise communicating fourth voice conversation information utilizing a proprietary type of computer network voice communication. The first mobile communication device 610 may then, for example, combine the fourth voice conversation information with outgoing voice information, if any, from a user of the first mobile communication device 610 and second voice conversation information, if any, from the second mobile communication device 620, place such combined information in a form compatible with the proprietary type of computer network voice communication and retransmit such information to the third mobile communication device 630.

As discussed previously, the first mobile communication device 610 may present the received fourth voice conversation information to a user of the first mobile communication device 610. For example, the first mobile communication device 610 may combine received second voice conversation information, third voice conversation information and fourth voice conversation information and communicate such combined information to a user of the first mobile communication device 610 through a user interface.

Continuing the non-limiting exemplary scenario, the first mobile communication device 610 may also be simultaneously communicating with the fifth mobile communication device 650 through the second cellular communication network 652 (e.g., through a second cellular telephone service, which may be the same or different from the first cellular telephone service). The first mobile communication device 610 may then, for example, combine the fifth voice conversation information with outgoing voice information, if any, from a user of the first mobile communication device 610, other voice conversation information, if any, from other mobile communication devices, place such combined information in a form compatible with the proprietary type of computer network voice communication and retransmit such information to the third mobile communication device 630 (and/or the other communication devices).

As discussed previously, the first mobile communication device 610 may present the received fifth voice conversation information to a user of the first mobile communication device 610. For example, the first mobile communication device 610 may combine the received second voice conversation information, third voice conversation information, fourth voice conversation information and fifth voice conversation information and communicate such combined information to a user of the first mobile communication device 610 through a user interface. Note the exemplary scenario was presented in the context of the first mobile communication device 610 combining information and transmitting such combined information to the third mobile communication device 630. The first mobile communication device 610 may similarly combine information and transmit combined information to each of the other mobile communication devices 620, 640 and 650.

The previous discussion of FIGS. 1-6 presented various exemplary mobile communication devices to provide specific illustrations of various generally broader aspects of the present invention. Accordingly, the scope of various aspects of the present invention should not be limited by characteristics of the exemplary mobile communication devices.

It should be noted that various modules of the previously discussed exemplary mobile communication devices may be implemented in hardware, software, or a combination thereof. Also, various modules may share portions of hardware and software. For example, a first and second module may share one or more hardware components and/or one or more software routines. Accordingly, the scope of various aspects of the present invention should not be limited by characteristics of any particular hardware or software implementation of the various modules or by arbitrary hardware and software boundaries between the various modules.

Further, the various modules of the exemplary mobile communication devices may be implemented in various degrees of integration. For example and without limitation, the modules may all be integrated on a single chip. Also for example, the various modules may be implemented in separate chips of a single circuit board. Accordingly, the scope of various aspects of the present invention should not be limited by characteristics of any particular implementation or level of integration of the various exemplary modules.

Figure 7:
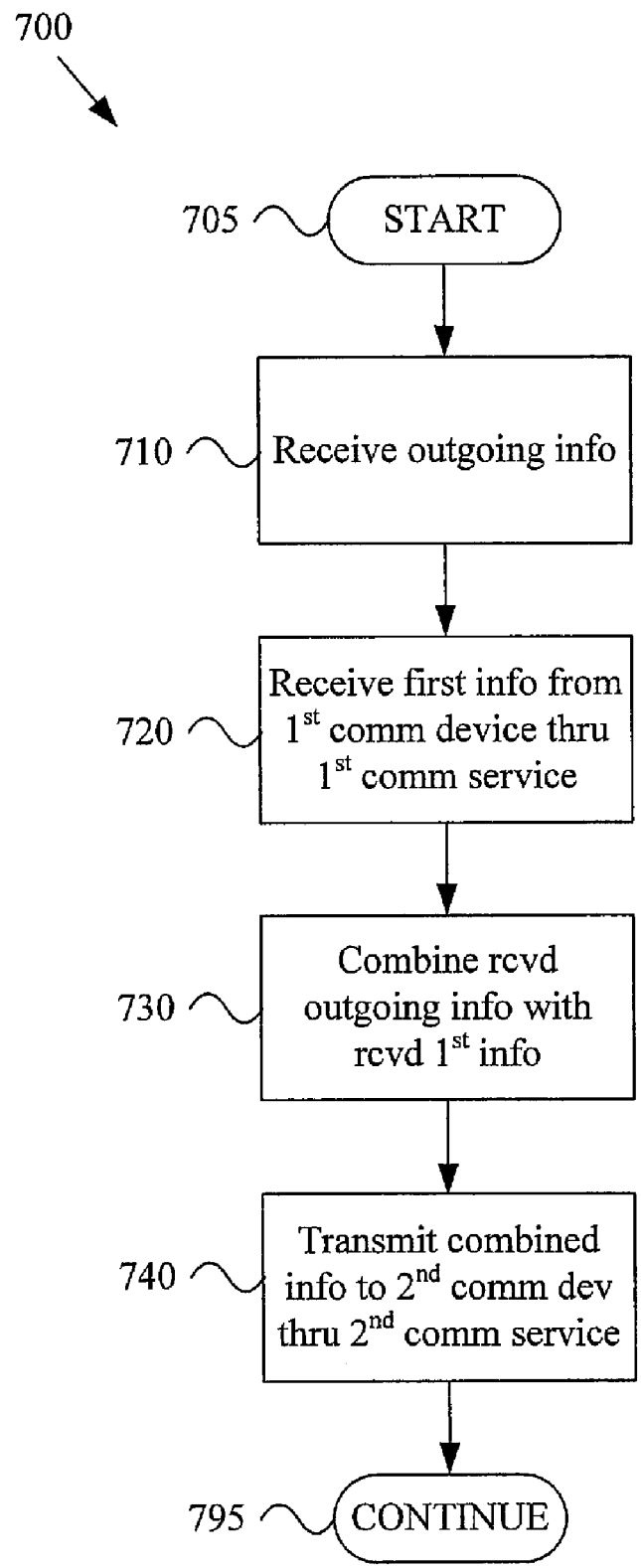
FIG. 7 is a diagram illustrating an exemplary method for operating a mobile communication device, in accordance with various aspects of the present invention.

FIG. 7 is a diagram illustrating an exemplary method 700 for operating a mobile communication device, in accordance with various aspects of the present invention. The exemplary method 700 may, for example and without limitation, share any or all functional characteristics with the exemplary mobile communication devices illustrated in FIGS. 1-6 and discussed previously.

The exemplary method 700 may begin executing at step 705. The exemplary method 700 may begin executing for any of a variety of reasons. For example and without limitation, the exemplary method 700 may begin executing on power-up or reset of a mobile communication device implementing the method 700. Also for example, the exemplary method 700 may begin executing in response to a detected communication condition or event (e.g., user initiation of an N-way communication, incoming communication associated with or requesting an N-way communication, etc.).

The exemplary method 700 may, at step 710, comprise receiving outgoing information through a user interface. Such outgoing information may comprise characteristics of any of a variety of types of information (e.g., voice conversation information, multimedia conversation information, audio information, video information, etc.).

The exemplary method 700 may, at step 720, comprise receiving (e.g., from a first communication device) first information communicated through a first communication service (e.g., over a first communication network). The first information may comprise characteristics of any of a variety of types of information (e.g., voice conversation information, multimedia conversation information, audio information, video information, etc.). Step 720 may comprise receiving the first information from any of a large variety of types of communication networks and/or communication services and utilizing any of a large variety of communication protocols. Various examples of information types, network types, protocol types and communication services were discussed previously.

The exemplary method 700 may, at step 730, comprise combining at least the received outgoing information and the received first information. Note that though exemplary steps 710 and 720 comprise receiving outgoing information and first information, such steps may also comprise receiving any number of types of information from any number of sources of such information.

Step 730 may comprise combining at least the received outgoing information and the received first information in any of a variety of manners. For example and without limitation, step 730 may comprise combining at least the received outgoing information and the received first information utilizing analog and/or digital components of a mobile communication device implementing the method 700 (e.g., to combine analog or digital signals corresponding to the received outgoing information and the received first information).

Step 730 may, for example, comprise combining non-encoded signals corresponding to the received outgoing information and received first information. In such scenarios, step 730 may also comprise performing various encoding and/or decoding operations. Non-limiting examples of such combining and/or other operations were provided in the previous discussion (e.g., of FIGS. 1 and 2). Non-limiting examples of such combining will also be presented in the discussion of FIG. 8.

Step 730 may also, for example, comprise combining encoded signals corresponding to the received outgoing information and received first information. In such scenarios, step 730 may also comprise performing various encoding and/or transcoding operations. Non-limiting examples of such combining and/or other operations were provided in the previous discussion (e.g., of FIGS. 1 and 3). Non-limiting examples of such combining will also be presented in the discussion of FIG. 9.

Step 730 may further, for example, comprise combining packetized information. Non-limiting examples of such combining, packetizing, depacketizing and packet multiplexing were provided in the previous discussion (e.g., of FIGS. 1 and 4). Non-limiting examples of such combining will also be presented in the discussion of FIG. 10.

In combining information from various sources, step 730 may comprise combining information from various sources and presenting such information in a consistently encoded manner. Alternatively for example, step 730 may comprise combining information utilizing a plurality of types of encoding. In such a scenario, a receiver of such combined information might decode such combined information in accordance with a plurality of corresponding types of decoding.

The exemplary method 700 may, at step 740, comprise transmitting the combined information to a second communication device (e.g., through a second communication network and associated second communication service). Step 740 may comprise transmitting the combined information in any of a variety of manners and utilizing any of a variety of communication protocols.

The exemplary method 700 may, at step 795, comprise performing continued processing. Such continued processing, at step 795 or any continued processing step discussed herein, may comprise characteristics of any of a variety of types of continued processing. For example and without limitation, step 795 may comprise maintaining an N-way communication session involving a changing array of other communication devices. Step 795 may also, for example, comprise providing user interface features to enhance a user's ability to conveniently initiate, participate in or manage an N-way communication session. Step 795 may comprise presenting combined received information to a user of the mobile communication device, as discussed previously.

Figure 8:
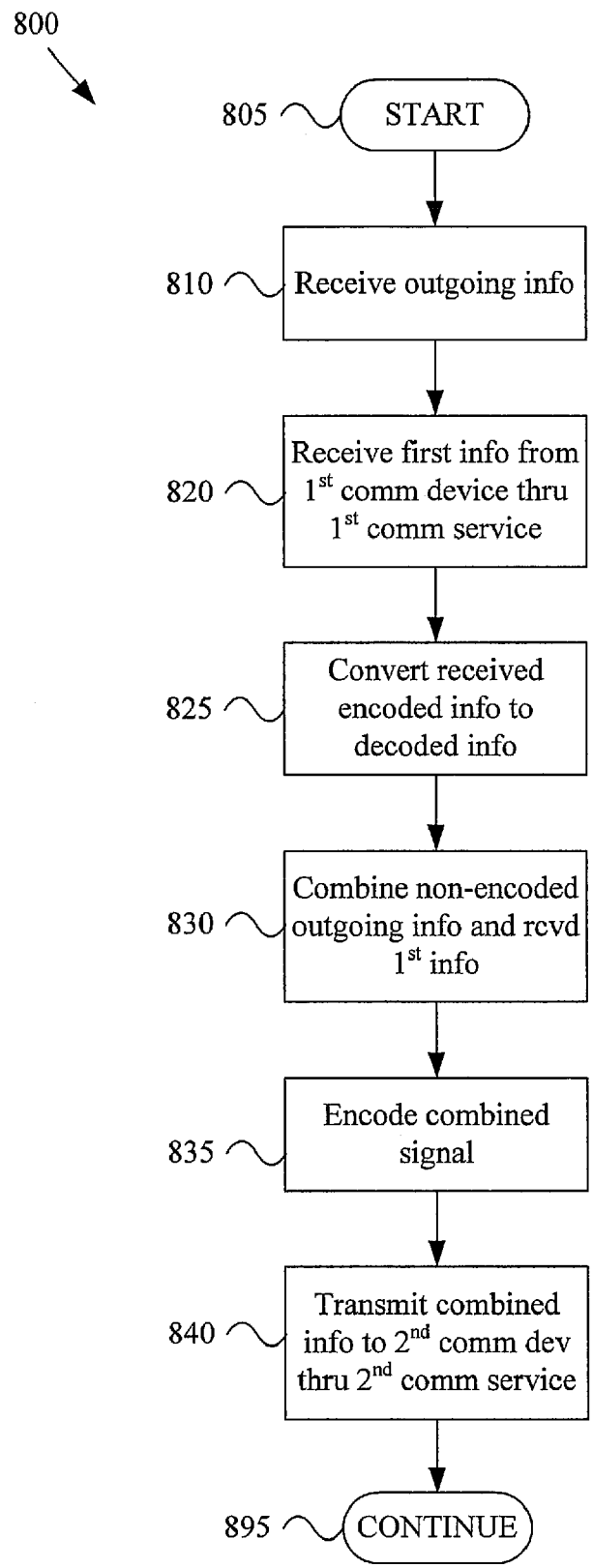
FIG. 8 is a diagram illustrating another exemplary method for operating a mobile communication device, in accordance with various aspects of the present invention.

FIG. 8 is a diagram illustrating another exemplary method 800 for operating a mobile communication device, in accordance with various aspects of the present invention. The exemplary method 800 may, for example, share any or all characteristics with the exemplary method 700 illustrated in FIG. 7 and discussed previously. Also for example, the exemplary method 800 may share any or all functional characteristics with the exemplary mobile communication devices illustrated in FIGS. 1-6 and discussed previously (e.g., the exemplary mobile communication devices 100 and 200 of FIGS. 1-2).

The exemplary method 800 may, at step 810, comprise receiving outgoing information from a user interface. Such outgoing information may comprise characteristics of any of a variety of types of information (e.g., voice conversation information, multimedia conversation information, audio information, video information, etc.).

Such outgoing information may, for example, comprise characteristics of non-encoded or decoded information. In one exemplary scenario, step 810 may comprise receiving non-encoded outgoing information from a user interface of the mobile communication device. In another exemplary scenario, step 810 may comprise receiving encoded outgoing information from a user interface of the mobile communication device and then decoding such information. In yet another exemplary scenario, step 810 may comprise receiving encoded outgoing information from a user interface, where such information is decoded at a subsequent step.

The exemplary method 800 may, at step 820, comprise receiving (e.g., from a first communication device) first information communicated through a first communication service (e.g., over a first communication network). The first information may comprise characteristics of any of a variety of types of information (e.g., voice conversation information, multimedia conversation information, audio information, video information, etc.).

Such first information may, for example, comprise characteristics of non-encoded or decoded information. In one exemplary scenario, step 820 may comprise receiving non-encoded first information from a first mobile communication device. In another exemplary scenario, step 820 may comprise receiving encoded first information from a first mobile communication device and then decoding such information. In yet another exemplary scenario, step 820 may comprise receiving encoded first information from a first mobile communication device, where such information is decoded at a subsequent step.

Step 820 may comprise receiving the first information from any of a large variety of types of communication networks and/or communication services and utilizing any of a large variety of communication protocols. Various examples of information types, network types, protocol types and communication services were discussed previously.

As mentioned previously, steps 810 and 820 may, in various scenarios, comprise receiving encoded information (e.g., encoded outgoing information from a user interface and/or encoded first information from a first mobile communication device). In such scenarios, the exemplary method 800 may, at step 825, comprise decoding the received encoded information.

The exemplary method 800 may, at step 830, comprise combining at least the received outgoing information and the received first information. For example and without limitation, step 830 may comprise combining a signal associated with the non-encoded (or decoded) received first information and a signal associated with the non-encoded (or decoded) received outgoing information.

Step 830 may comprise combining the received information in any of a variety of manners. For example and without limitation, step 830 may comprise combining a first analog signal corresponding to received outgoing information and a second analog signal corresponding to received first information. Also for example, step 830 may comprise combining a first digital signal corresponding to the received outgoing information and a second digital signal corresponding to the received first information. Note that though the illustrative step 830 comprises combining information from two sources, various aspects of the present invention readily extend to receiving and/or combining information from more than two (i.e., N>=2) sources.

The exemplary method 800 may, at step 835, comprise encoding the information combined at step 830. For example, in an exemplary scenario, where step 830 comprises generating a single signal representative of the combined non-encoded received outgoing information and non-encoded received first information, step 835 may comprise encoding such information for subsequent transmission. Step 835 may comprise performing such encoding in any of a variety of manners depending on the types of information combined, various communication constraints, the ability of a receiver of such encoded information to decode such information, etc.

The exemplary method 800 may, at step 840, comprise transmitting the combined information to a second communication device (e.g., through a second communication network and associated second communication service). Step 840 may comprise transmitting the combined information in any of a variety of manners and utilizing any of a variety of communication protocols.

Figure 9:
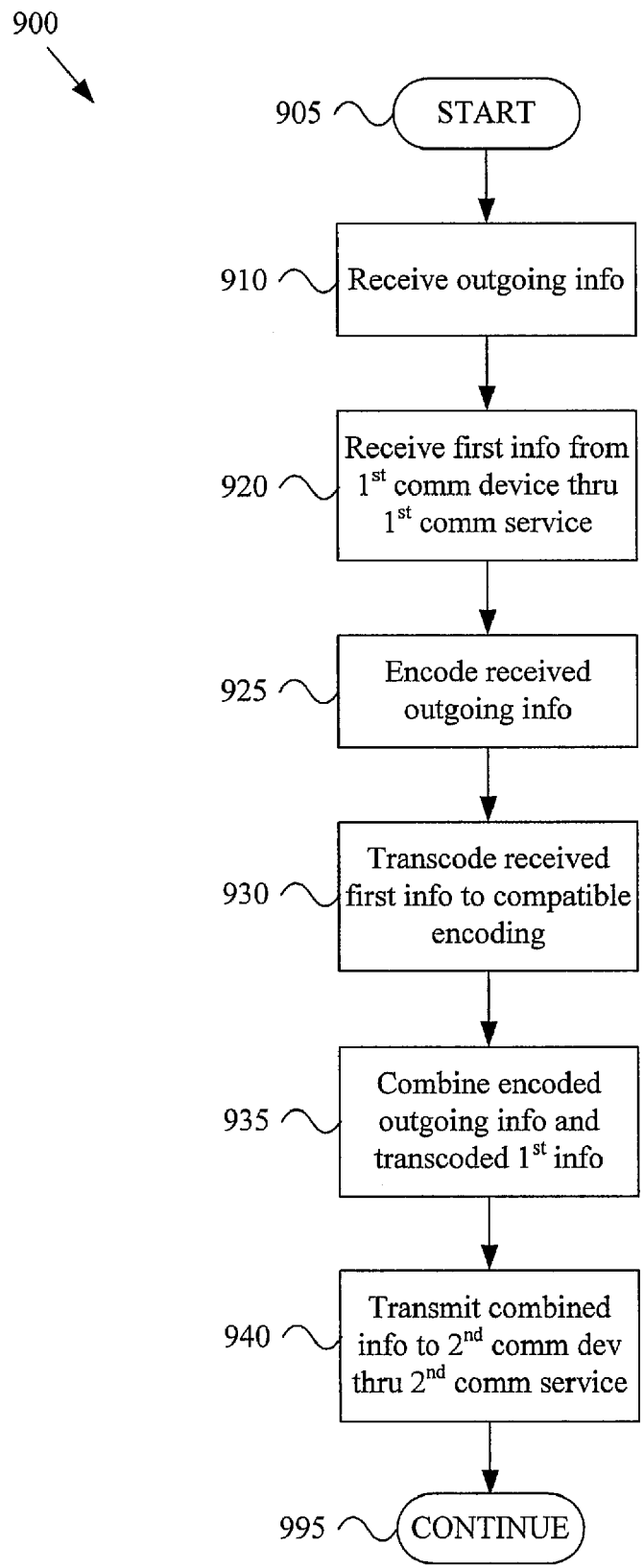
FIG. 9 is a diagram illustrating an additional exemplary method for operating a mobile communication device, in accordance with various aspects of the present invention.

FIG. 9 is a diagram illustrating an additional exemplary method 900 for operating a mobile communication device, in accordance with various aspects of the present invention. The exemplary method 900 may, for example, share any or all characteristics with the exemplary methods 700 and 800 illustrated in FIGS. 7-8 and discussed previously. Also for example, the exemplary method 900 may share any or all functional characteristics with the exemplary mobile communication devices illustrated in FIGS. 1-6 and discussed previously (e.g., the exemplary mobile communication devices 100 and 300 of FIGS. 1 and 3).

The exemplary method 900 may, at step 910, comprise receiving outgoing information from a user interface. Such outgoing information may comprise characteristics of any of a variety of types of information (e.g., voice conversation information, multimedia conversation information, audio information, video information, etc.).

Such outgoing information may, for example, comprise characteristics of encoded or non-encoded (or decoded) information. In one exemplary scenario, step 910 may comprise receiving non-encoded outgoing information from a user interface of the mobile communication device. Such information may later be encoded (e.g., prior to combining). In another exemplary scenario, step 910 may comprise receiving encoded outgoing information from a user interface of the mobile communication device. In yet another exemplary scenario, step 910 may comprise receiving encoded outgoing information from a user interface, where such information is decoded at a subsequent step.

The exemplary method 900 may, at step 920, comprise receiving (e.g., from a first communication device) first information communicated through a first communication service (e.g., over a first communication network). The first information may comprise characteristics of any of a variety of types of information (e.g., voice conversation information, multimedia conversation information, audio information, video information, etc.).

Such first information may, for example, comprise characteristics of encoded or non-encoded (or decoded) information. In one exemplary scenario, step 920 may comprise receiving encoded first information from a first mobile communication device. In another exemplary scenario, step 920 may comprise receiving non-encoded first information from a first mobile communication device and then encoding such information. In yet another exemplary scenario, step 920 may comprise receiving encoded first information from a first mobile communication device, where such information is transcoded at a subsequent step.

Step 920 may comprise receiving the first information from any of a large variety of types of communication networks and/or communication services and utilizing any of a large variety of communication protocols. Various examples of information types, network types, protocol types and communication services were discussed previously.

As mentioned previously, steps 910 and 920 may, in various scenarios, comprise receiving non-encoded information (e.g., non-encoded outgoing information from a user interface and/or non-encoded first information from a first mobile communication device). In such scenarios, the exemplary method 900 may, at step 925, comprise encoding the received non-encoded information.

The exemplary method 900 may, at step 930, comprise transcoding information between various types of encoding. As a non-limiting example, step 920 may comprise receiving first information that is encoded with a first type of encoding. Step 930 may then, for example, comprise transcoding the first information to another particular type of encoding. Such transcoding may be performed in any of a variety of manners, depending on the original and final types of encoding. As a non-limiting example, such transcoding may comprise decoding an input signal that was encoded in accordance with a first encoding scheme and then encoding the decoded signal in accordance with a second encoding scheme. Also for example, such transcoding may comprise directly converting between such first and second encoding schemes.

In a non-limiting exemplary scenario (e.g., where a variety of types of transcoding may be performed), step 930 may comprise selecting an original and final type of encoding. Step 930 may then, for example, comprise performing the selected type of transcoding. Such performing may, for example, comprise controlling transcoding hardware and/or software adapted to perform such transcoding.

Note that such transcoding may be applied to information received from one or more sources. For example, step 930 may comprise transcoding information received from any number of communication devices.

The exemplary method 900 may, at step 935, comprise combining at least the received outgoing information (e.g., received at step 910) and the received first information (e.g., received at step 920). Step 935 may, for example, comprise combining encoded information corresponding to the received outgoing information and encoded information corresponding to the received first information. Such information may, for example, have been encoded at step 925 and/or transcoded at step 930. Such information may, for example, have been encoded in accordance with a common encoding scheme. In various scenarios, such information may alternatively have been encoded in accordance with different encoding schemes.

The exemplary method 900 may, at step 940, comprise transmitting the combined information to a second communication device (e.g., through a second communication network and associated second communication service). Step 940 may comprise transmitting the combined information in any of a variety of manners and utilizing any of a variety of communication protocols.

Figure 10:
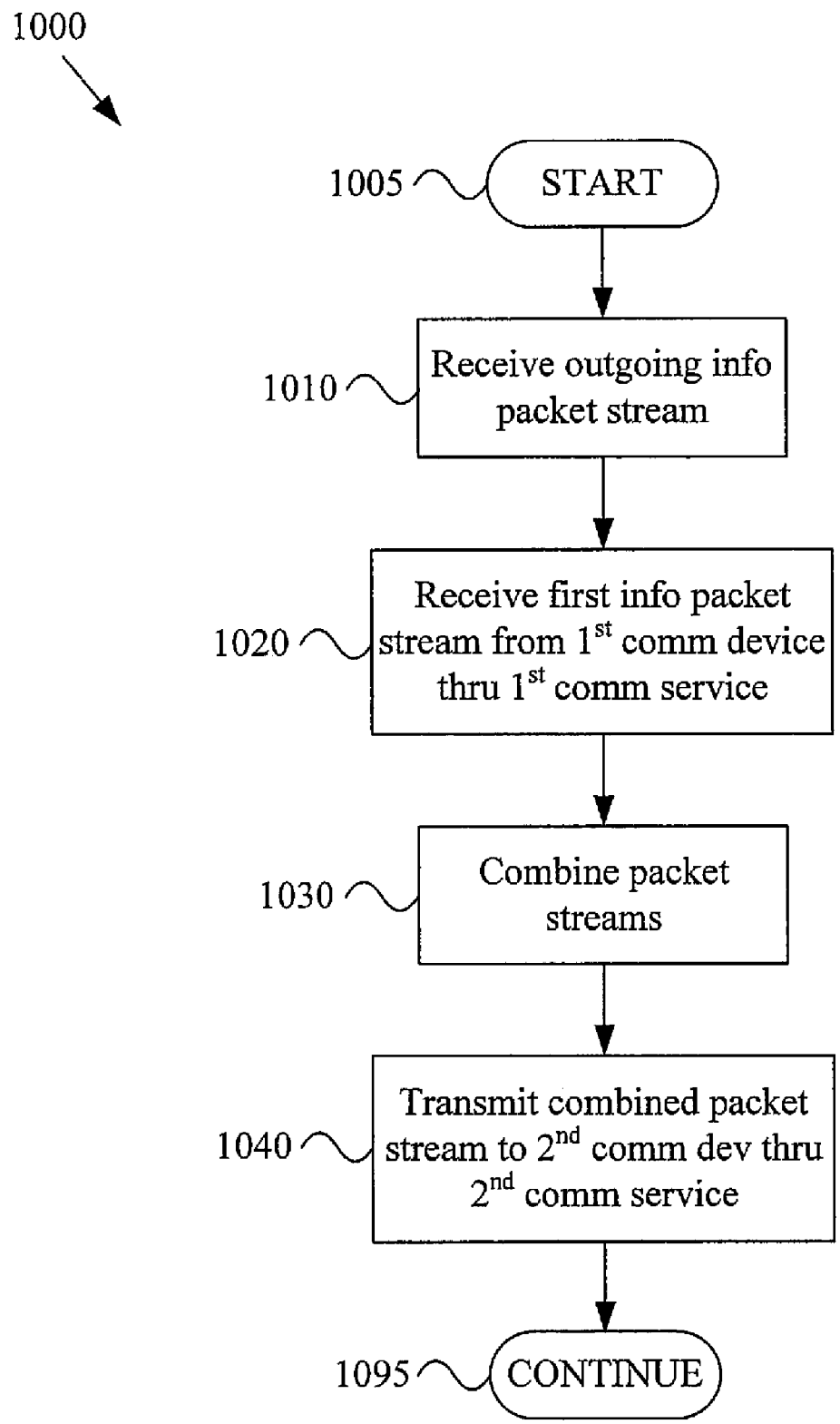
FIG. 10 is a diagram illustrating yet another exemplary method for operating a mobile communication device, in accordance with various aspects of the present invention.

FIG. 10 is a diagram illustrating yet another exemplary method 1000 for operating a mobile communication device, in accordance with various aspects of the present invention. The exemplary method 1000 may, for example, share any or all characteristics with the exemplary methods 700-900 illustrated in FIGS. 7-9 and discussed previously. Also for example, the exemplary method 1000 may share any or all functional characteristics with the exemplary mobile communication devices illustrated in FIGS. 1-6 and discussed previously (e.g., the exemplary mobile communication devices 100 and 400 of FIGS. 1 and 4).

The exemplary method 1000 may, at step 1010, comprise receiving outgoing information from a user interface. Such outgoing information may comprise characteristics of any of a variety of types of information (e.g., voice conversation information, multimedia conversation information, audio information, video information, etc.).

Such outgoing information may, for example, comprise characteristics of packetized information (e.g., packetized encoded or non-encoded information). Such packetized information may, for example, be in the form of a stream of data packets. In one exemplary scenario, step 1010 may comprise receiving packetized non-encoded outgoing information from a user interface of the mobile communication device. Such information may later be encoded and/or re-packetized (e.g., prior to combining). In another exemplary scenario, step 1010 may comprise receiving packetized encoded outgoing information from a user interface of the mobile communication device. In yet another exemplary scenario, step 1010 may comprise receiving encoded or non-encoded outgoing information from a user interface, where such information is packetized at a subsequent step.

The exemplary method 1000 may, at step 1020, comprise receiving (e.g., from a first communication device) first information communicated through a first communication service (e.g., over a first communication network). The first information may comprise characteristics of any of a variety of types of information (e.g., voice conversation information, multimedia conversation information, audio information, video information, etc.).

Such first information may, for example, comprise characteristics of packetized encoded or non-encoded (or decoded) information. Such packetized information may, for example, be in the form of a stream of data packets. In one exemplary scenario, step 1020 may comprise receiving packetized encoded first information from a first mobile communication device. In another exemplary scenario, step 1020 may comprise receiving packetized non-encoded first information from a first mobile communication device and then encoding and/or re-packetizing such information. In yet another exemplary scenario, step 1020 may comprise receiving packetized first information from a first mobile communication device, where such information is re-packetized (and/or encoded or transcoded) at a subsequent step.

Step 1020 may comprise receiving the first information from any of a large variety of types of communication networks and/or communication services and utilizing any of a large variety of communication protocols. Various examples of information types, network types, protocol types and communication services were discussed previously.

As mentioned previously, steps 1010 and 1020 may, in various scenarios, comprise receiving encoded information (e.g., encoded outgoing information from a user interface and/or encoded first information from a first mobile communication device). In such scenarios, the received information may be encoded in accordance with a common encoding scheme or may be encoded in accordance with different respective encoding schemes. In a scenario involving different encoding schemes, such information may be left encoded as-is or may, for example, be transcoded to place such information in a consistent type of coding (e.g., prior to combining and transmitting).

The exemplary method 1000 may, at step 1030, comprise combining at least the received outgoing information and the received first information. Step 1030 may comprise combining the received information (e.g., as received at steps 1010 and 1020) in any of a variety of manners. For example and without limitation, step 1030 may comprise multiplexing a first data packet stream associated with the received outgoing information and a second data packet stream associated with the received first information. Such multiplexing may, for example, comprise placing packets corresponding to a plurality of packet streams into a single packet stream. In various exemplary scenarios, step 1030 may also comprise re-packetizing particular packets (e.g., to place packets into a consistent format, for example, in accordance with a particular communication protocol).

The exemplary method 1000 may, at step 1040, comprise transmitting the combined information to a second communication device (e.g., through a second communication network and associated second communication service). Step 1040 may comprise transmitting the combined information in any of a variety of manners and utilizing any of a variety of communication protocols.

The previous discussion of the exemplary methods 700-1000 illustrated in FIGS. 7-10 presented various exemplary methods and method steps to provide specific illustrations of various generally broader aspects of the present invention. Accordingly, the scope of various aspects of the present invention should not be limited by characteristics of the exemplary methods or method steps.

Various aspects of the present invention have also been described above with the aid of method steps illustrating the performance of specified functions and relationships thereof. The boundaries and sequence of these method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have additionally been described above with the aid of functional building blocks illustrating the performance of certain significant functions. The boundaries of these functional building blocks and relationships between various functional building blocks have been arbitrarily defined for convenience of description. Alternate boundaries or relationships could be defined as long as the certain significant functions are appropriately performed. Such alternate boundaries or relationships are thus within the scope and spirit of the claimed invention. Additionally, the functional building blocks, and other illustrative blocks, modules and components herein, can be implemented as illustrated or by discrete components, application specific integrated circuits, processors executing appropriate software and the like or any combination thereof.

In summary, various aspects of the present invention provide a mobile communication device providing N-way communication through a plurality of communication services. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A mobile communication device comprising:
   at least one module operable to, at least:
   communicate through a first communication service;
   communicate through a second communication service while communicating through the first communication service;
   receive outgoing information through a user interface of the mobile communication device;
   receive first information through the first communication service;
   combine the received outgoing information and the received first information; and
   transmit the combined information through the second communication service,
   wherein the first communication service and the second communication service are associated with different respective cellular telephone communication services.

2. The mobile communication device of claim 1, wherein:
   the received outgoing information and the received first information each comprise audio information; and
   the at least one module is operable to combine at least the received outgoing information and the received first information by, at least in part, combining respective non-encoded audio signals corresponding to audio information of the received outgoing information and audio information of the received first information.

3. The mobile communication device of claim 1, wherein the at least one module is operable to:
   decode the received first information; and
   combine at least the received outgoing information and the received first information by, at least in part, combining a signal associated with the decoded received first information and a signal associated with the received outgoing information.

4. The mobile communication device of claim 1, wherein:
   the at least one module comprises an analog signal combiner; and
   the at least one module is operable to combine at least the received outgoing information and the received first information by, at least in part, utilizing the analog signal combiner to combine a first analog signal corresponding to the received outgoing information and a second analog signal corresponding to the received first information.

5. The mobile communication device of claim 1, wherein:
   the at least one module comprises a digital signal combiner; and
   the at least one module is operable to combine at least the received outgoing information and the received first information by, at least in part, utilizing the digital signal combiner to combine a first digital signal corresponding to the received outgoing information and a second digital signal corresponding to the received first information.

6. The mobile communication device of claim 1, wherein:
   the received outgoing information and the received first information each comprise audio information; and
   the at least one module is operable to combine at least the received outgoing information and the received first information by, at least in part, combining respective encoded audio signals corresponding to audio information of the received outgoing information and audio information of the received first information.

7. The mobile communication device of claim 1, wherein:
   the received outgoing information and the received first information each comprise audio information; and
   the at least one module is operable to:
   encode a first audio signal corresponding to audio information of the received outgoing information; and
   encode a second audio signal corresponding to audio information of the received first information.

8. The mobile communication device of claim 1, wherein:
   the at least one module comprises a transcoder operable to trans code the received first information from a first type of encoding to a particular type of encoding; and
   the at least one module is operable to combine at least the received outgoing information and the received first information by, at least in part, combining the received outgoing information with the received first information encoded with the particular type of encoding.

9. The mobile communication device of claim 1, wherein:
   the at least one module comprises an encoder operable to encode the received outgoing information with a particular type of encoding;
   the at least one module comprises a transcoder operable to transcode the received first information from a first type of encoding to the particular type of encoding; and
   the at least one module is operable to combine at least the received outgoing information and the received first information by, at least in part, combining the received outgoing information encoded with the particular type of encoding with the received first information encoded with the particular type of encoding.

10. The mobile communication device of claim 9, wherein:
the transcoder is operable to transcode between a first plurality of selectable types of encoding and a second plurality of selectable types of encoding; and
the at least one module is further operable to:
select the first type of encoding from the first plurality of selectable types of encoding and select the particular type of encoding from the second plurality of selectable types of encoding; and
control the transcoder to transcode the received first information from the first type of encoding to the particular type of encoding.

11. The mobile communication device of claim 1, wherein:
the received outgoing information and the received first information each comprise audio information; and
the at least one module is operable to combine at least the received outgoing information and the received first information by, at least in part, combining a packet stream associated with the received outgoing information and a packet stream associated with the received first information.

12. The mobile communication device of claim 1, wherein:
the at least one module comprises a data packet multiplexer; and
the at least one module is operable to combine at least the received outgoing information and the received first information by multiplexing a first data packet stream associated with the received first information and a second data packet stream associated with the received outgoing information.

13. The mobile communication device of claim 12, wherein audio information in the first data packet stream is encoded with a first type of encoding, and audio information in the second data packet stream is encoded with a second type of encoding different from the first type of encoding.

14. The mobile communication device of claim 1, wherein the first communication service is associated with a cellular telephone communication service, and the second communication service is associated with a computer network communication service.

15. The mobile communication device of claim 1, wherein the first communication service is associated with communicating voice conversation information over a cellular telephone network, and the second communication service is associated with communicating VoIP over a computer network.

16. In a mobile communication device ("MCD"), a method for providing N-way communication through a plurality of communication services, the method comprising:
establishing a first communication link with a first communication service;
establishing a second communication link with a second communication service while the first communication link is established;
receiving outgoing information through a user interface of the MCD;
receiving first information over the first communication link;
combining at least the received outgoing information and the received first information; and
transmitting the combined information over the second communication link,
wherein the first communication service and the second communication service are associated with different respective cellular telephone communication services.

17. The method of claim 16, wherein:
the received outgoing information and the received first information each comprise audio information; and
combining at least the received outgoing information and the received first information comprises combining respective non-encoded audio signals corresponding to audio information of the received outgoing information and audio information of the received first information.

18. The method of claim 16, further comprising decoding the received first information, and wherein combining at least the received outgoing information and the received first information comprises combining a signal associated with the decoded received first information and a signal associated with the received outgoing information.

19. The method of claim 16, wherein combining at least the received outgoing information and the received first information comprises combining a first analog signal corresponding to the received outgoing information and a second analog signal corresponding to the received first information.

20. The method of claim 16, wherein combining at least the received outgoing information and the received first information comprises combining a first digital signal corresponding to the received outgoing information and a second digital signal corresponding to the received first information.

21. The method of claim 16, wherein combining at least the received outgoing information and the received first information comprises combining respective encoded audio signals corresponding to audio information of the received outgoing information and audio information of the received first information.

22. The method of claim 16, further comprising:
encoding a first audio signal corresponding to audio information of the received outgoing information; and
encoding a second audio signal corresponding to audio information of the received first information.

23. The method of claim 16, further comprising transcoding the received first information from a first type of encoding to a particular type of encoding, and wherein combining at least the received outgoing information and the received first information comprises combining the received outgoing information with the received first information encoded with the particular type of encoding.

24. The method of claim 16, further comprising:
encoding the received outgoing information with a particular type of encoding; and
transcoding the received first information from a first type of encoding to the particular type of encoding; and
wherein combining at least the received outgoing information and the received first information comprises combining the received outgoing information encoded with the particular type of encoding with the received first information encoded with the particular type of encoding.

25. The method of claim 24, further comprising:
selecting the first type of encoding from a plurality of selectable types of encoding;
selecting the particular type of encoding from a plurality of selectable types of encoding; and
controlling transcoding of the received first information from the first type of encoding to the particular type of encoding.

26. The method of claim 16, wherein:
the received outgoing information and the received first information each comprise audio information; and combining at least the received outgoing information and the received first information comprises combining a packet stream associated with the received outgoing information and a packet stream associated with the received first information.

27. The method of claim 16, wherein combining at least the received outgoing information and the received first information comprises multiplexing a first data packet stream associated with the received first information and a second data packet stream associated with the received outgoing information.

28. The method of claim 27, wherein audio information in the first data packet stream is encoded with a first type of encoding, and audio information in the second data packet stream is encoded with a second type of encoding different from the first type of encoding.

29. The method of claim 16, wherein the first communication service is associated with a cellular telephone communication service, and the second communication service is associated with a computer network communication service.

30. The method of claim 16, wherein the first communication service is associated with communicating voice conversation information over a cellular telephone network, and the second communication service is associated with communicating VoIP over a computer network.

31. A mobile communication device (MCD) comprising:
at least one module operable to, at least:
establish a first communication link with a first communication service;
establish a second communication link with a second communication service while the first communication link is established;
receive outgoing information through a user interface of the MCD;
receive first information over the first communication link;
combine at least the received outgoing information and the received first information; and
transmit the combined information over the second communication link,
wherein the first communication service and the second communication service are associated with different respective cellular telephone communication services.

32. The mobile communication device of claim 31, wherein:
the received outgoing information and the received first information each comprise audio information; and
the at least one module is operable to combine at least the received outgoing information and the received first information by, at least in part, combining respective non-encoded audio signals corresponding to audio information of the received outgoing information and audio information of the received first information.

33. The mobile communication device of claim 31, wherein the at least one module is operable to:
decode the received first information; and
combine at least the received outgoing information and the received first information by, at least in part, combining a signal associated with the decoded received first information and a signal associated with the received outgoing information.

34. The mobile communication device of claim 31, wherein:
the at least one module comprises an analog signal combiner; and
the at least one module is operable to combine at least the received outgoing information and the received first information by, at least in part, utilizing the analog signal combiner to combine a first analog signal corresponding to the received outgoing information and a second analog signal corresponding to the received first information.

35. The mobile communication device of claim 31, wherein:
the at least one module comprises a digital signal combiner; and
the at least one module is operable to combine at least the received outgoing information and the received first information by, at least in part, utilizing the digital signal combiner to combine a first digital signal corresponding to the received outgoing information and a second digital signal corresponding to the received first information.

36. The mobile communication device of claim 31, wherein:
the received outgoing information and the received first information each comprise audio information; and
the at least one module is operable to combine at least the received outgoing information and the received first information by, at least in part, combining respective encoded audio signals corresponding to audio information of the received outgoing information and audio information of the received first information.

37. The mobile communication device of claim 31, wherein:
the at least one module comprises a transcoder operable to transcode the received first information from a first type of encoding to a particular type of encoding; and
the at least one module is operable to combine at least the received outgoing information and the received first information by, at least in part, combining the received outgoing information with the received first information encoded with the particular type of encoding.

38. The mobile communication device of claim 31, wherein:
the at least one module comprises an encoder operable to encode the received outgoing information with a particular type of encoding;
the at least one module comprises a transcoder operable to transcode the received first information from a first type of encoding to the particular type of encoding; and
the at least one module is operable to combine at least the received outgoing information and the received first information by, at least in part, combining the received outgoing information encoded with the particular type of encoding with the received first information encoded with the particular type of encoding.

39. The mobile communication device of claim 38, wherein:
the transcoder is operable to transcode between a first plurality of selectable types of encoding and a second plurality of selectable types of encoding; and
the at least one module is further operable to:
select the first type of encoding from the first plurality of selectable types of encoding and select the particular type of encoding from the second plurality of selectable types of encoding; and
control the transcoder to transcode the received first information from the first type of encoding to the particular type of encoding.

40. The mobile communication device of claim 31, wherein:

the received outgoing information and the received first information each comprise audio information; and the at least one module is operable to combine at least the received outgoing information and the received first information by, at least in part, combining a packet stream associated with the received outgoing information and a packet stream associated with the received first information.

41. The mobile communication device of claim 31, wherein:

the at least one module comprises a data packet multiplexer; and the at least one module is operable to combine at least the received outgoing information and the received first information by multiplexing a first data packet stream associated with the received first information and a second data packet stream associated with the received outgoing information.

42. The mobile communication device of claim 41, wherein audio information in the first data packet stream is encoded with a first type of encoding, and audio information in the second data packet stream is encoded with a second type of encoding different from the first type of encoding.

43. The mobile communication device of claim 31, wherein the first communication service is associated with a cellular telephone communication service, and the second communication service is associated with a computer network communication service.

44. The mobile communication device of claim 31, wherein the first communication service is associated with communicating voice conversation information over a cellular telephone network, and the second communication service is associated with communicating VoIP over a computer network.

\* \* \* \* \*